3,192,032
METHOD OF MAKING SLOW RELEASE UREA FERTILIZERS

Charles L. Thomas, Swarthmore, Pa., assignor to Sun Oil Company, Philadelphia, Pa., a corporation of New Jersey
No Drawing. Filed Oct. 24, 1963, Ser. No. 318,510
5 Claims. (Cl. 71—28)

This invention relates in one aspect to a method of forming a stable dispersion of urea in molten paraffin wax. The dispersion is stable in that the urea does not react with the molten paraffin wax to form an adduct. This reaction is prevented, and stability thus imparted to the dispersion, by incorporating into the paraffin wax a small amount of a compound selected from the group consisting of naphthenic acids and metal salts thereof. The stable dispersion is useful in that a slow release urea fertilizer can be made therefrom and the invention also embraces such slow release fertilizer compositions.

Nitrogen, potassium, and phosphorus are essential elements for plant growth and commercially available fertilizers invariably contain one or more of these elements. Examples of those in frequent use at the present time include urea, ammonium nitrate, potassium chloride, sodium nitrate, monoammonium phosphate, diammonium phosphate, potassium sulfate, calcium cyanamide, potassium nitrate, superphosphate (a mixture of calcium acid phosphate and calcium sulfate), and triple superphosphate (calcium acid phosphate). Urea is a preferred source of nitrogn because it contains a higher percentage of nitrogen than the other nitrogen fertilizer compounds mentioned.

The number of fertilizer compounds applied to the soil at a given time depends mainly upon the soil analysis and the crops to be grown. In some cases only nitrogen is needed, hence only a nitrogen fertilizer is applied. In the majority of cases, however, all three of the essential elements are needed and in such cases the fertilizer actually applied to the soil is a blend of a nitrogen fertilizer, a potassium fertilizer, and a phosphorous fertilizer. Some compounds such as diammonium phosphate contain more than one essential element. A fertilizer containing all three essential elements is conventionally referred to as a complete fertilizer. It is also conventional to state the amount of each essential element in the complete fertilizer by a series of numbers which refer, in order, to the weight percentage of nitrogen (as N), phosphorous (as $P_2O_5$), and potassium (as $K_2O$) in the fertilizer. For example a 20–10–5 fertilizer contains 20% nitrogen, 10% phosphorus, and 5% potassium by weight. Fertilizers lacking an essential element are also described by this system but by conventional terminology they are not complete fertilizers. Thus a 10–0–10 fertilizer contains 10% nitrogen, no phosphorus, and 10% potassium. In addition to the above, most conventional fertilizers, whether complete or otherwise, contain some inert material in order to maintain the percentage of the essential elements present in the fertilizer at a relatively low level in an attempt to avoid excessive local concentrations of, say, nitrogen in the soil which may result in "burned" crops.

Unfortunately most of the commercial fertilizers mentioned previously are readily water soluble and this creates a number of disadvantages. In a heavy rainfall much of the fertilizer may be dissolved in the rainwater and soaked into the ground below the plant roots or rapidly transported away by flowing surface water. This fertilizer never becomes available to the plants. Another disadvantage is that the fertilizer often becomes available to the plant too rapidly resulting in injury to the plant rather than benefit. This is often noticed in "burned" lawns or crops.

One method of reducing the rate at which the fertilizer is consumed is to mix the fertilizer and molten wax, i.e., disperse the fertilizer in molten wax, form the dispersion into small particles in a mold and allow the particles to cool below the melting point of the wax. The resulting particles are a dispersion of solid fertilizer particles in solid wax. Substantially all the fertilizer particles are surrounded by and encased in wax. They can also be described as a slow release fertilizer. The water resistance of the fertilizer can be varied, by varying the amount of wax in the dispersion, so as to provide the proper rate of release of essential elements for the particular climatic conditions encountered. In areas of relatively heavy rainfall the water resistance of the fertilizer should normally be relatively high and the amount of wax in the dispersion should be relatively high. Conversely, in relatively dry areas the water resistance should be relatively low and the amount of wax in the dispersion should be relatively low.

It was mentioned previously that urea is a preferred source of nitrogen since it contains a relatively high (47%) amount of nitrogen. This feature of urea becomes especially valuable when a slow release fertilizer is prepared in the manner described above. The wax portion of the slow release fertilizer contributes no nitrogen, potassium, or phosphorus. Furthermore, the wax reduces the proportion of actual fertilizer materials in the slow release fertilizer. This being the case it becomes necessary to use fertilizer ingredients having a high content of essential elements. For this reason most slow release fertilizers will contain urea as a source of nitrogen. The actual urea content of the slow release fertilizer will vary rather widely depending upon the particular type of fertilizer. A slow release nitrogen fertilizer will normally contain a major amount of urea, i.e., more than 50%, and a minor amount, i.e., less than 50%, of wax. Usually the amount of urea will be 50–80%, more frequently 50–70%, and the amount of wax will be 15–49%, more frequently 25–49%, the exact amounts depending upon climatic conditions as described above. All percentages and parts herein are by weight.

In the case of a slow release fertilizer containing a plurality of essential elements the total amount of fertilizer ingredients and the amount of wax will still normally be a major amount and a minor amount respectively, usually 50–80% and 15–49% respectively, more frequently 50–70% and 25–49% respectively, but the actual amount of urea may in some cases be relatively small. For example, a 10–10–10 complete slow release fertilizer might contain the following:

| | Percent |
|---|---|
| Urea | 21.4 |
| Triple superphosphate | 21.8 |
| Potassium chloride | 16.7 |
| Wax | 40.1 |
| | 100.0 |

A 5–15–10 complete slow release fertilizer might contain

| | Percent |
|---|---|
| Urea | 10.7 |
| Triple superphosphate | 32.6 |
| Potassium sulfate | 18.5 |
| Wax | 38.2 |
| | 100.0 |

In most cases the amount of urea will not be less than 5%. Usually it will be at least 10%, more frequently 20%. Therefore, considering both the case where the urea is the only fertilizer ingredient and the case where urea is one of a plurality of fertilizer ingredients, the amount of urea will usually be 5–80% urea, more frequently 20–70%, and the amount of wax will usually be 15–49%, more frequently 25–49%.

Although several different kinds of waxes can be used to prepare a slow release fertilizer paraffin wax is often preferred because of its generally lower cost. However, when urea is mixed, i.e., dispersed in, molten paraffin wax a difficulty is encountered. When the urea and molten paraffin wax are initially mixed, nothing unusual occurs. Shortly after mixing, however, a white precipitate forms. If the ratio of urea to molten paraffin wax is higher than 1:1, the entire mass becomes a solid having about the texture of wet sand. In this case it is extremely difficult to even remove the solid mass from the mixing vessel. The solid precipitate is not merely a physical mixture of wax and urea because when the precipitate is separated and heated to 210° F. the wax component thereof, which has a melting point of 129° F., does not melt. Analysis of the precipitate indicates that it is a urea-paraffin wax adduct having a composition of about 76% urea–24% paraffin wax. The time required for adduction, i.e., for the formation of the precipitate, varies somewhat but appears to depend mainly upon urea particle size. When commercial crystal urea, which has a particle size of mainly larger than 100 mesh (all mesh sizes are by U.S. Standard Sieves) as used, adduction generally occurs in less than 15 minutes. When urea having a particle size of 100% through 200 mesh is used, adduction generally occurs in less than 5 minutes. In any event the adduction reaction often occurs before the dispersion of urea in wax, containing other fertilizer ingredients as the case may be, can be shaped into small particles.

The solid adduct itself has some slow release properties and has been disclosed and claimed in a copending application Serial No. 308,087, filed September 11, 1963. In fact the water resistance of a urea-paraffin wax adduct is higher than the water resistance of a dispersion of urea in paraffin wax containing the same total amounts of urea and wax but in which the urea is in the unadducted form. Unfortunately the water resistance of the adduct has sometimes been found to decrease very rapidly after prolonged contact with water. This decrease is an unpredictable phenomenon in that some batches of adduct exhibit it while other, apparently identical, batches do not. Because of this erratic behavior it is frequently preferable that the slow release fertilizer be a dispersion of solid urea in solid paraffin wax rather than a urea-paraffin wax adduct. Where such is the case a method of preventing or at least postponing the adduction reaction is necessary in order that such reaction does not occur during the time the dispersion is being processed into small particles. We have now found such a method.

According to the invention, reaction between urea and molten paraffin wax to form an adduct is prevented by incorporating, i.e., dissolving, in the molten wax a compound selected from the group consisting of naphthenic acids and metal salts thereof. The term naphthenic acids is a conventional term which refers to a group of relatively high molecular weight, saturated carbolyxic acids obtainable from petroleum. These acids all contain a naphthene ring and a carboxylic acid radical. The naphthene ring is usually cyclopentane but is sometimes cyclohexane or cycloheptane. In most cases the naphthene ring will contain one or more alkyl sidechains although this is not always the case. Where present, each sidechain usually contains 1–15 carbon atoms. In some cases the naphthene ring is condensed or substituted with another naphthene ring which also is usually cyclopentane, cyclohexane, or cycloheptane. The carboxylic acid group can be attached to the naphthene ring itself, as in the case of

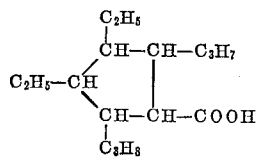

but it is usually attached to one of the alkyl sidechains mentioned above as in the case of

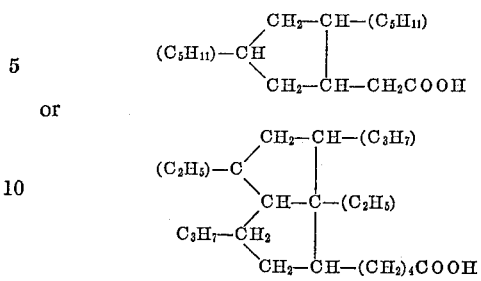

The naphthenic acids can also be defined by the formula RCOOH wherein R is a saturated hydrocarbon radical containing at least one cyclopentane, cyclohexane, or cycloheptane ring.

The separation of naphthenic acids from petroleum is well known and is described, for example, in U.S. Patent No. 2,296,039 and in Kirk-Othmer, Encyclopedia of Chemical Technology, vol. 9, pp. 241–247 (1952). The usual procedure involves scrubbing a petroleum distillate such as kerosine, gas oil, or lubricating oil fractions with aqueous caustic soda. The resulting aqueous sodium naphthenate solution normally contains some oil which is removed by settling and decantation, solvent extraction, etc. The oil-free aqueous sodium naphthenate solution is then acidified, usually with $H_2SO_4$, to precipitate the naphthenic acids which are then separated. The recovered naphthenic acids are a blend of a plurality of individual naphthenic acids described above. The average molecular weight of the blend, as determined by acid number, is usually 200–800 and this molecular weight range is satisfactory for the present purpose although preferably for the present purpose the molecular weight is 200–500.

The naphthenic acids employed in the method of the invention can be, and preferably are, a blend of several naphthenic acids as normally recovered from petroleum. If desired, one or more individual naphthenic acids can be separated from such a blend and employed to prevent adduction of urea and molten paraffin wax. In addition, such naphthenic acids can be prepared synthetically and when so prepared they are also suitable for the present purpose. So long as the acid, or acids in the case of a blend, conforms to the description previously given for naphthenic acids as found in petroleum, the source from which the acid is obtained is not critical.

Another group of compounds suitable for the present purpose is metal salts of the naphthenic acids described above. The metal component of the salt can be any metal such as sodium, potassium, lithium, calcium, barium, strontium, aluminum, magnesium, etc. The alkali and alkaline earth metals are preferred. As between the naphthenic acids and metal salts thereof the former are preferred.

As described previously adduction of a mixture of urea and molten paraffin wax can be prevented by dissolving in the parafin wax a compound selected from the group consisting of naphthenic acids and metal salts thereof. It is recognized that in a substantially homogeneous mixture of molten paraffin wax and such a compound, the compound may not be "dissolved" in the wax in the technical sense of the word. However, such a mixture has the appearance of a true solution and therefore is so referred to for the present purpose, i.e., in a substantially homogeneous mixture of molten paraffin wax and such a compound, the latter is referred to as dissolved in the wax.

The amount of naphthenic acid or metal salt thereof, hereinafter referred to as the compound, used should, of course, be a stabilizing amount, i.e., the amount should be sufficient to prevent or at least substantially delay the adduction reaction. In most cases the dispersion of urea in wax will be processed into solid fertilizer particles, hence the adduction reaction should be delayed for the time required to effect such processing. Whether the amount is sufficient is readily determined by observing whether a white precipitate forms. More specifically, the amount of compound should normally be at least 0.5%, based on the weight of molten paraffin wax, preferably at least 1%, more preferably at least 3%. Preferably not more than 15% compound, more preferably not more than 10% based on the weight of molten paraffin wax, is used since it is usually desirable to minimize the amount of non-fertilizer ingredients in the slow release fertilizer, although amounts of compound as high as 25% can be used if desired. As previously stated the amount of wax and urea will usually be 15–49 parts and 5–80 parts respectively, more frequently 25–49 parts and 20–70 parts respectively.

The dissolution of the compound in the molten paraffin wax and the subsequent addition of urea (and any other fertilizer ingredients as the case may be) can be effected in any convenient manner. Preferably, the paraffin wax is heated to about 200°–250° F. and the compound is then added and the mixture stirred until the compound dissolves in the wax. After the compound has dissolved in the wax the mixture is preferably cooled to slightly above, e.g., 10°–20° F., the melting point of the wax before adding the urea to the solution. This is to eliminate any possibility of adduction. Since the adduction reaction occurs more readily at higher temperatures reducing the temperature aids in preventing adduction. Next the urea is charged and dispersed in the wax-compound solution. If other fertilizer ingredients are to be included they are also added to the molten wax at this time. After dispersing the fertilizer ingredients in the wax compound solution the dispersion can be formed into discrete particles by any convenient means such as in a pellet mill, etc., after which the particles are cooled to obtain solid slow release fertilizer particles. As previously described the invention also embraces such slow release fertilizers, i.e., slow release fertilizers containing solid urea dispersed in solid paraffin wax, the paraffin wax having dissolved therein a compound selected from the group consisting of naphthenic acids and metal salts thereof.

An alternative but less preferable method of forming the dispersion is to charge the urea to the molten wax after which the compound is then dissolved in the wax. This method is considerably less desirable since the urea may and frequently does react with the paraffin wax to form the adduct before the compound can be dissolved in the wax. This problem is obviated by dissolving the compound in the wax prior to the addition of urea.

The term paraffin wax is used throughout this specification in accordance with its conventional meaning. It is one of only two waxes obtainable from petroleum, the other being microcrystalline wax. The differences and similarities between these two kinds of wax are well known to those skilled in the art and are summarized in Bennett, Commercial Waxes, Chemical Publishing Co. (1950), pp. 84–88. Both paraffin microcrystalline waxes contain mainly saturated paraffin hydrocarbons, the former containing mainly straight chain paraffins while the latter contains a substantial amount of branched chain paraffins. Some typical properties of paraffin and microcrystalline waxes are shown in Table I below.

TABLE I

| Property | Paraffin Wax | Microcrystalline Wax |
|---|---|---|
| Molecular Weight | 250–500 | 500–800 |
| Melting Point (ASTM D–127) °F | 110–165 | 140–210 |
| Viscosity at 210 °F. (ASTM D–446) S.U.S. | 30–50 | 60–100 |
| Penetration at 77 °F. (ASTM D–1321—100 g., 5 sec.) dmm | 5–25 | 5–25 |

It is apparent from the data in Table I that some of the physical properties of the paraffin waxes overlap the normal range of the same property in the microcrystalline waxes. The property which can be used, as is well known, to distinguish paraffin wax from microcrystalline wax is the type of crystals present in each. Paraffin wax has large well-formed crystals while microcrystalline wax contains small irregular crystals and no well-formed crystals of any size. Indeed, microcrystalline wax is sometimes referred to as amorphous. The invention is preferably applicable to the dispersion of urea in a paraffin wax having melting point, viscosity, and penetration within the ranges stated in Table I above. All wax properties specified herein are by the appropriate tests indicated in the above table.

The following examples illustrate the benefits which can be obtained by the method of the invention.

*Example I*

40 parts of a paraffin wax having a melting point of 129° F., a penetration at 77° F. of 18 dmm., and a viscosity at 210° F. of 38 S.U.S. are charged to a mixing tank equipped with heating means. The wax is heated to 200° F. after which 60 parts of commercial crystal urea are added to the molten paraffin wax with stirring. After 5 minutes stirring the entire contents of the mixing tank have become a solid having about the texture of wet sand. The solid is analyzed and is found to contain a substantial amount of a urea-paraffin wax adduct, a small amount of wax, and essentially no free urea.

*Example II*

The procedure is the same as in Example I except that the amount of wax used is 38 parts and, in addition, prior to adding the urea 2 parts of a mixture of naphthenic acids are added to and dissolved in the molten paraffin wax. The naphthenic acids have been obtained by aqueous caustic soda scrubbing of the 700°–1000° F. fraction of a Coastal crude oil followed by acidification of the resulting aqueous sodium naphthenate solution. The naphthenic acids used in this example had an acid number of 135, an average molecular weight of 415, a pour point of 75° F., and a viscosity of about 500 S.U.S. at 210° F. The temperature of the wax-naphthenic acid solution at the time urea was added thereto was 240° F. After the addition of urea the resulting slurry was stirred as in Example I. After 1½ hours stirring adduction of the urea had not occurred. The slurry remained fluid and could be shaped into fertilizer size particles by means of a mold, etc. After the 1½ hour stirring period the experiment was ended.

When metal salts of naphthenic acids are employed instead of the acids themselves similar results are obtained, i.e., the adduction reaction is prevented or at least substantially delayed.

The invention claimed is:

1. Method of forming a slow release fertilizer comprising a dispersion of solid urea in a solid paraffin wax which when in molten state normally reacts with solid urea to form an adduct which comprises (1) heating said paraffin wax to above its melting point, (2) adding to and dissolving in the resulting molten paraffin wax an adduct inhibitor selected from the group consisting of naphthenic acids having a molecular weight of 200–800 and metal salts thereof, the amount of said adduct inhibitor being at least 0.5% by weight of said molten paraffin wax, (3) dispersing solid urea in the molten paraffin wax containing said inhibitor, and (4) cooling the resulting dispersion to below the melting point of the wax whereby a slow release fertilizer comprising a dispersion of solid urea in solid paraffin wax is obtained.

2. Method according to claim 1 wherein the amount of said compound is at least 1%.

3. Method according to claim 1 wherein the amount of said compound is at least 3%.

4. Method according to claim 1 wherein said compound is a naphthenic acid.

5. Method according to claim 1 wherein the amount of urea is 5–80 parts, the amount of molten paraffin wax is 15–49 parts, and the amount of said compound is 0.5–15.0%.

References Cited by the Examiner

UNITED STATES PATENTS

| | | | |
|---|---|---|---|
| 2,348,687 | 5/44 | Abrams et al. | 117—168 |
| 2,513,997 | 7/50 | Gibb | 117—100 |
| 2,727,832 | 12/55 | Christensen et al. | 117—168 |
| 2,936,226 | 5/60 | Kaufman et al. | 71—64 |
| 3,014,783 | 12/61 | Young | 71—64 |
| 3,096,196 | 7/63 | Bettoli et al. | 117—168 |

DONALL H. SYLVESTER, *Primary Examiner.*

ANTHONY SCIAMANNA, *Examiner.*